United States Patent
Xiao et al.

(10) Patent No.: US 11,994,700 B2
(45) Date of Patent: May 28, 2024

(54) BAND-PASS NEAR-INFRARED (NIR) FILTER, METHOD OF PRODUCTION OF A BAND-PASS NIR FILTER AND USES THEREOF

(71) Applicant: SCHOTT GLASS TECHNOLOGIES (SUZHOU) CO. LTD., Jiangsu (CN)

(72) Inventors: Wei Xiao, Shanghai (CN); Yigang Li, Shanghai (CN); Guangjun Zhang, Shanghai (CN)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 567 days.

(21) Appl. No.: 17/227,988

(22) Filed: Apr. 12, 2021

(65) Prior Publication Data

US 2021/0231847 A1 Jul. 29, 2021

Related U.S. Application Data

(63) Continuation of application No. PCT/CN2018/109711, filed on Oct. 10, 2018.

(51) Int. Cl.
*G02B 5/20* (2006.01)
*C03C 3/083* (2006.01)
(Continued)

(52) U.S. Cl.
CPC .............. *G02B 5/208* (2013.01); *C03C 3/083* (2013.01); *C03C 3/085* (2013.01); *C03C 3/087* (2013.01);
(Continued)

(58) Field of Classification Search
CPC . G02B 5/208; G02B 5/20; G02B 5/28; G02B 5/281; G02B 5/285; G02B 5/286;
(Continued)

(56) References Cited

U.S. PATENT DOCUMENTS 6,465,105 B1 10/2002 Johnson
2012/0224265 A1* 9/2012 Clark ..................... G02B 5/283
359/584

(Continued)

FOREIGN PATENT DOCUMENTS

CN        1226878 A  *  8/1999  ............. C03B 27/00
CN      104155712        11/2014
(Continued)

*Primary Examiner* — Arnel C Lavarias
(74) *Attorney, Agent, or Firm* — Ruggiero McAllister & McMahon LLC

(57) ABSTRACT

A band-pass near-infrared (NIR) filter has a glass substrate and at least one coating. The glass substrate has a scale factor that is smaller than 1500 kPa/K. The maximum internal stress of the glass substrate at an operating temperature $T_{OT}$ is smaller than 300 MPa. A method of production of such a band-pass NIR filter includes depositing a band-pass NIR coating that has alternating layers of high refractive index material and low refractive index material on at least one side of the glass substrate to form a coated glass substrate. Such a band-pass NIR filter can be used in an infrared sensor for object recognition.

21 Claims, 6 Drawing Sheets

(51) Int. Cl.
  *C03C 3/085* (2006.01)
  *C03C 3/087* (2006.01)
  *C03C 3/089* (2006.01)
  *C03C 3/091* (2006.01)
  *C03C 3/093* (2006.01)
  *C03C 3/095* (2006.01)
  *C03C 3/097* (2006.01)
  *C03C 17/34* (2006.01)

(52) U.S. Cl.
  CPC .............. *C03C 3/089* (2013.01); *C03C 3/091* (2013.01); *C03C 3/093* (2013.01); *C03C 3/095* (2013.01); *C03C 3/097* (2013.01); *C03C 17/3482* (2013.01); *C03C 2217/734* (2013.01); *C03C 2218/156* (2013.01)

(58) Field of Classification Search
  CPC ..... G02B 27/0012; C03C 3/083; C03C 3/085; C03C 3/087; C03C 3/089; C03C 3/091; C03C 3/093; C03C 3/095; C03C 3/097; C03C 17/3482; C03C 2217/734; C03C 2218/156; C03C 3/076; C03C 3/078; C03C 17/34; C03C 17/3411; C03C 17/3417; C03C 17/3429; C03C 2217/73
  USPC ....... 359/359, 350, 577, 580, 582, 586, 588, 359/589, 590
  See application file for complete search history.

(56) References Cited

U.S. PATENT DOCUMENTS

| | | |
|---|---|---|
| 2014/0185134 A1 | 7/2014 | Kamitakahara et al. |
| 2017/0090083 A1 | 3/2017 | Takishita |
| 2017/0183255 A1* | 6/2017 | Walther .................. C03C 3/083 |
| 2017/0347086 A1 | 11/2017 | Watanabe |
| 2018/0149781 A1 | 5/2018 | Ockenfuss |
| 2020/0201397 A1* | 6/2020 | DeMartino ............... G06F 1/16 |

FOREIGN PATENT DOCUMENTS

| | | | |
|---|---|---|---|
| CN | 106660308 | 5/2017 | |
| DE | 202017100512 | 2/2017 | |
| EP | 638526 A1 * | 2/1995 | ............ C03C 3/093 |
| JP | 2001066426 | 3/2001 | |
| JP | 2002311201 | 10/2002 | |
| JP | 2004026511 | 1/2004 | |
| JP | 2004053997 | 2/2004 | |
| JP | 2004182598 | 7/2004 | |
| JP | 2005162520 | 6/2005 | |
| WO | 2017/000069 | 1/2017 | |
| WO | 2017127994 | 8/2017 | |

* cited by examiner

BAND-PASS NEAR-INFRARED (NIR) FILTER, METHOD OF PRODUCTION OF A BAND-PASS NIR FILTER AND USES THEREOF

CROSS-REFERENCE TO RELATED APPLICATION

The present application is a continuation of International Patent Application No. PCT/CN2018/109711, filed on Oct. 10, 2018, which is herein incorporated by reference.

BACKGROUND OF THE DISCLOSURE

1. Field of the Disclosure

The present disclosure relates to a band-pass near-infrared (NIR) filter and to a method of production of a band-pass NIR filter. The disclosure further relates to the use of such band-pass NIR filter, in particular in an infrared sensor, such as for object recognition, in particular facial recognition.

2. Discussion of the Related Art

Currently, facial recognition systems are widely integrated in consumer electronics, especially is smart phones. Generally, facial recognition systems utilize a combination of and infrared emitter and an infrared sensor. For example, one of the current systems projects 30,000 dots of infrared light on and around the face, and then, the infrared sensor captures the reflection to calculate depth and angle for each dot and construct a depth map of the face.

In order to capture a more accurate reflection, a narrow band-pass near-infrared (NIR) filter is generally applied to the infrared sensor to improve signal quality. An NIR filter allows for passage of the IR signal within the designed bandwidth, while rejecting/blocking unwanted/ambient light outside the bandwidth. The narrower the bandwidth, the better the signal to noise ratio.

There are major problems associated with the prior art. First, the production yield of the current NIR filters is not high as filters comparably often break during dicing that is regularly applied after coating the glass substrate. For example, a coated glass substrate having a size of 77*77 mm$^2$ may be diced into smaller pieces having a size of 7*7 mm$^2$ or 4*4 mm$^2$ or 3*3 mm$^2$.

Breakage of the substrate during dicing reduces the production yield. Second, the refractive index of the glass substrate often changes when the NIR filter is used at increased operating temperatures which in turn could lead to a shift of the center wavelength of the filter. Besides this, there are problems with a comparably high warp and angle shift of the filters.

SUMMARY OF THE DISCLOSURE

It is therefore an object of the present disclosure to overcome the problems of the prior art.

In particular, it is an object of the disclosure to provide a method of producing a band-pass NIR filter with the method having a good production yield.

It is a further object of the disclosure to provide a band-pass NIR filter with improved properties such as in particular a low refractive index shift at increased temperatures. A low warp and/or low angle shift are also desired.

These and other objects are addressed in the present disclosure. The objects are in particular solved by a method of producing a band-pass near-infrared (NIR) filter, the method comprising the following steps:

a) Providing a glass substrate having a length $L_{0,GL}$ at a temperature $T_0$ and having a scale factor I that is smaller than 1500 kPa/K, wherein I is defined by the equation $$I = \frac{E}{1-v} \cdot \alpha,$$

wherein E is the Young's modulus, v is the Poisson's ratio and α is the coefficient of thermal expansion (CTE) in the range of 20° C. to 300° C., b) Depositing a band-pass NIR coating comprising alternating layers of high refractive index material and low refractive index material on at least one side of the glass substrate such that the high refractive index material is in direct contact with the glass substrate and has a length $L_{CT,HRF}$, wherein the glass substrate reaches a maximum temperature $T_{CT}$ and a maximum length $L_{CT,GL}$ during deposition of the coating, c) Letting the coated glass substrate cool to the temperature $T_0$, wherein $T_0$ is lower than 30° C., and wherein the glass has a length $L_{0,GL}$-$L_{TS,GL}$ when reaching $T_0$, wherein $L_{TS,GL}$ accounts for length reduction due to a decrease of fictive temperature, wherein the coated glass substrate has the property that the glass has a length $L_{OT,GL}$-$L_{TS,GL}$ when being heated to an operating temperature $T_{OT}$ subsequent to step c) with $T_0 < T_{OT} < T_{CT}$ and that the high refractive index material being in direct contact with the glass substrate has a length $L_{OT,HRF}$ at temperature $T_{OT}$, wherein the difference $$\frac{L_{OT,HRF}}{L_{CT,HRF}} - \frac{L_{OT,GL} - L_{TS,GL}}{L_{CT,GL}}$$

is smaller than 0.05

The object is also solved by a band-pass near-infrared (NIR) filter comprising a glass substrate and at least one coating, wherein the glass substrate has a scale factor I that is smaller than 1500 kPa/K, wherein I is defined by the equation $$I = \frac{E}{1-v} \cdot \alpha,$$

wherein E is the Young's modulus, v is the Poisson's ratio and α is the coefficient of thermal expansion (CTE) in the range of 20° C. to 300° C., and wherein the maximum internal stress of the glass substrate at operating temperature $T_{OT}$ is smaller than 500 MPa, preferably smaller than 400 MPa, or smaller than 300 MPa. The maximum internal stress can be calculated using equation (1) below, or alternatively it can be measured using a polarized stress meter.

BRIEF DESCRIPTION OF THE DRAWINGS

FIG. 1A shows the transmittance in the range of 650 nm to 1200 nm. FIG. 1B shows the respective transmittance curves for transmittance of at least 85%.

DETAILED DESCRIPTION OF THE DISCLOSURE

Figure 1A:
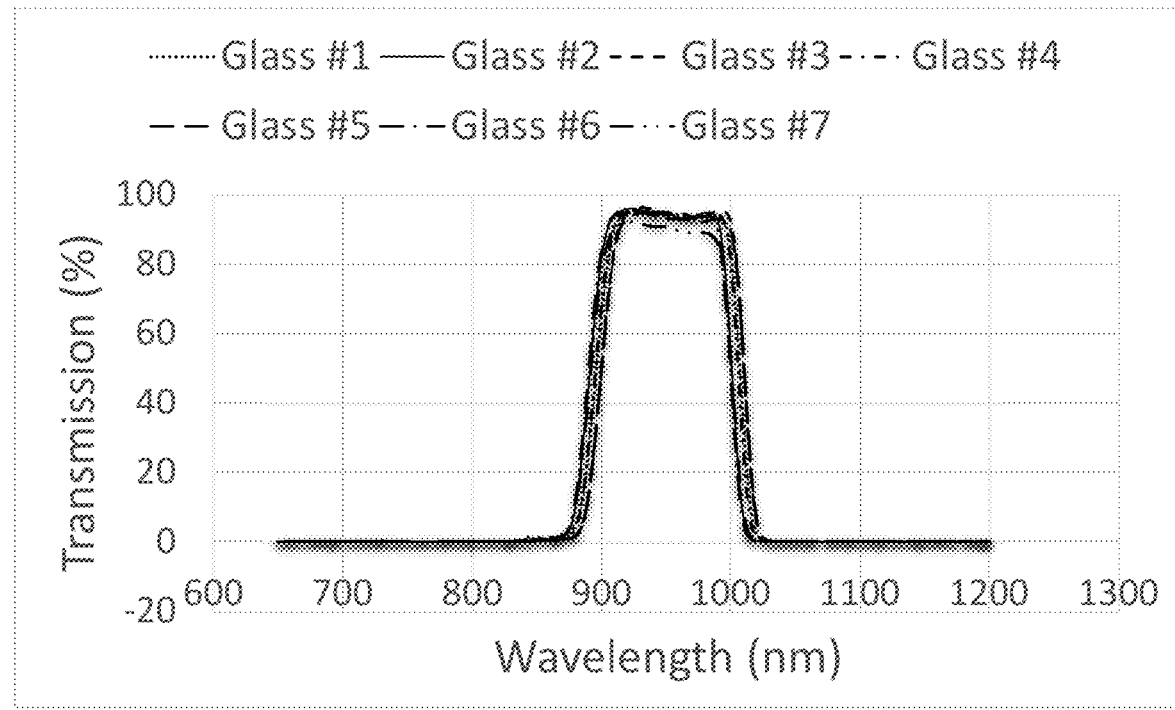
FIGS. 1A and 1B show the total transmittance of band-pass NIR filters of the disclosure obtained based on different substrate glasses.

Independent of whether $SiO_2/TiO_2$ with an evaporation deposition process or $SiO_2$/a-Si:H with a magnetron sputtering process is used for coating a glass substrate for production of a band-pass NIR filter, an interactive stress between the film and the glass substrate is induced due to the mismatch between the mechanical and thermal properties of the film and the glass. There are two interactive stresses that are of particular importance.

First, an interactive stress is generated upon cooling the coated glass substrate from the coating temperatures $T_{CT}$ down to the dicing temperature $T_{DT}$. The coated glass substrates are commonly diced into smaller sizes subsequent to coating as described above. The dicing temperature is the temperature at which such dicing takes place. As the dicing temperature is lower than the coating temperature, both the glass substrate and the coating are present in a contracted form during dicing. The extent of contraction depends amongst others on the coefficient of thermal expansion (CTE) of the material. Generally, glass has higher CTE as compared to the coating material. Therefore, the glass substrate contracts more as compared to the coating so that an interactive stress is generated. The coefficient of thermal expansion is synonymously referred to as "CTE" or as "a" within the present description. If not indicated otherwise, the coefficient of thermal expansion as referred to herein is the coefficient of linear thermal expansion. The CTE is preferably determined according to ISO 7991: 1987 (E).

The increased interactive stress between the film and the glass substrate could potentially lead to low yielding rates of the fabrication process because the glass substrate may be damaged during dicing due to the interactive stress as described in more detail below. Thus, it would be advantageous if the CTE of glass and coating were matched in order to reduce the interactive stress and thus increase the yielding rates.

However, the inventors found that other factors are relevant with respect to the interactive stress as well. After being coated, the glass substrate will bend due to the interactive stress as mentioned above. The bending radius can be estimated using the following equation:

$$R \propto \frac{1}{6\sigma(d_f + d_s)d_f}\left[\frac{E_f d_f^3}{(1-v_f)} + \frac{E_s d_s^3}{(1-v_s)}\right] \quad (1)$$

where f stands for the coated film and s stands for the substrate, i.e. glass; d=thickness; E=Young's modulus; v=Poisson's ratio; a=interactive stress between the film and the substrate. The coated film includes the alternating layers of high refractive index material and low refractive index material. Poisson's ratio of the coated film can be calculated as $V_f = \Sigma_1^n v_i V_i$ with $v_i$=Possion's ratio of each layer in the coated film, and $V_i$=volume fraction of the respective material. Young's modulus of the coated film can be calculated as $$\frac{1}{E_f} = \sum_{i1}^{n} \frac{V_i}{E_i}$$

with $E_i$=Young's modulus of each layer in the coated film, and $V_i$=volume fraction of the respective material.

The interactive stress due to temperature change can be calculated using the following equation:

$$\sigma \propto \frac{E_s}{1-v_S}(\alpha_s - \alpha_f)\Delta T \quad (2)$$

where α=coefficient of thermal expansion; ΔT=temperature change.

Thus, the interactive stress is dependent upon a complex interplay of several factors such as Young's modulus, Poisson's ratio and coefficient of thermal expansion. The inventors defined a scale factor I that describes the magnitude of the interactive stress the glass would subjected to after being coated:

$$I = \frac{E}{1-v} \cdot \alpha \quad (3)$$

The interactive stress can have huge impacts on the yielding rate of the dicing process. As a blade is sawing through the coated glass during the dicing process, the interactive stress could aid crack propagation because less energy is required when a crack propagates through the area that is already under tension. Thus, reduction of interactive stress is desirable from this point of view.

It needs to be noted that the interactive stress is not only dependent on the interplay of Young's modulus, Poisson's ratio and CTE described above because another factor of is contraction or shrinkage of the glass substrate plays an important role as well. Heating the glass, for example during coating, may allow contraction to occur so that the glass sample may become shorter than its initial length. It is advantageous to reduce this additional contraction in order to reduce the interactive stress.

Furthermore, it needs to be noted that the tension does not only result from the interactive stress between the glass substrate and the coated film, but also from the "interactive stress" between the outer layer and the inner layer of the glass because of the non-uniform cooling rate during the coating process. Thus, it is advantageous if this cooling rate is also adjusted in order to be more uniform. In particular, it is advantageous if the coated glass substrate is not cooled very fast after coating. Preferably, the average cooling rate of step c) of letting the coated glass substrate cool to the temperature $T_0$ is at most 500 K/s, more preferably at most 200 K/s, more preferably at most 150 K/s, more preferably at most 100 K/s, more preferably at most 75 K/s.

Notably, interactive stresses not only occur due to temperature differences of coating temperature and dicing temperature. The second group of highly relevant interactive stresses is based on temperature differences between coating temperature $T_{CT}$ and operating temperature $T_{OT}$. The phenomena underlying such interactive stresses are basically the same as described above for the interactive stresses based on the temperature differences of coating temperature and dicing temperature. However, as the operating temperature differs from the dicing temperature, the thermal expansion behavior should be optimized with respect to the operating temperature as well. The operating temperature is the temperature during use of the NIR filter, for example during facial recognition.

Another important difference between interactive stress at operating temperature and interactive stress at dicing temperature are the different effects of the respective stresses. As described above, interactive stress based on the temperature difference of coating is temperature and dicing temperature is negatively affecting the yield of the production process due to breakage of the glass substrate upon dicing. Another phenomenon is highly important concerning the interactive stress based on the temperature difference of coating temperature and dicing temperature. Namely, the interactive stress may affect the refractive index n of the glass substrate because glass is a photoelastic material. As shown in the following equation, the change in refractive index can be calculated as the product of the internal stress a and the stress optical coefficient (SOC).

$$\Delta n = \sigma \cdot SOC \qquad (4)$$

Assuming a glass with a SOC of 30 (nm/cm)/MPa with an interactive stress of 500 MPa, the apparent refractive index can change as much as 0.0015 (which is probably noticeable by the naked eyes). Therefore, an efficient way of minimizing the impacts from photoelastic effects may be reducing the interactive stress. Additionally, it is advantageous if the glass has a small SOC. Preferably, the SOC is in the range of from 20 to 40 (nm/cm)/MPa, more preferably from 20 to 35 (nm/cm)/MPa, more preferably from 20 to 30 (nm/cm)/MPa, still more preferably from 20 to 25 (nm/cm)/MPa. The SOC is preferably determined according to ASTM C770.

The internal stress a is dependent on the interactive stress between the glass substrate and the coating. The internal stress a is actually a stress profile across the glass bulk. In fact, the internal stress is highest on the surface of the glass substrate and gradually decreases towards the interior of the glass substrate. Thus, the internal stress a is a function a(x) with x being the depth position. According to the present disclosure and in view of the above, the term "maximum internal stress" refers to the internal stress at the surface of the glass substrate, in particular at the surface of the glass substrate being in contact with the NIR coating, in particular with the high refractive index material of the coating because this is the position at which a(x) has its maximum. As the internal stress at the surface of the glass substrate is the maximum internal stress that is caused by the interactive stress between glass substrate and coating, the values of interactive stress and maximum internal stress are identical according to the disclosure. For example if there is an interactive stress of 250 MPa between glass substrate is and coating, the maximum internal stress of the glass substrate is 250 MPa as well. Notably, as $\Delta n$ is proportional to the internal stress as described above, $\Delta n$ is largest on the glass surface and gradually decreases as the internal stress decreases towards the center of the glass.

The scale factor I is correlated to the magnitude of the interactive stress the glass would be subjected to after being coated. For different glasses, when they were coated with same settings (and the coating material has a small CTE; smaller than the glasses), larger scale factor I correlates with a larger interactive stress; smaller scale factor I correlates with a smaller interactive stress. The present disclosure provides glasses with very low scale factor I so that the glass is highly advantageous as substrate glass for NIR filter application. Preferably, the scale factor I is smaller than 1300 kPa/K, more preferably smaller than 1200 kPa/K, more preferably smaller than 1100 kPa/K, more preferably smaller than 1000 kPa/K.

Preferably, the coating has a thickness of not more than 500 μm, more preferably at most 250 μm, more preferably at most 100 μm, more preferably at most 50 am, more preferably at most 20 μm, still more preferably at most 10 μm. A thin coating is particularly advantageous as there is a trend towards smaller/thinner products such as for example mobile phones in which the band-pass NIR filter of the present disclosure may be used.

Preferably, the Young's modulus of the glass substrate is in the range of from 50 GPa to 90 GPa, more preferably from 60 GPa to 85 GPa. Such Young's modulus is particularly advantageous for achieving comparably low interactive stresses. The Young's modulus is preferably determined by an ultrasonic echography method, in particular according to ASTM C623.

Preferably, the Poisson's ratio of the glass substrate is in the range of from 0.18 to 0.3, more preferably from 0.2 to 0.25. Such Poisson's ratio is particularly advantageous for achieving comparably low interactive stresses. The Poisson's ratio v is preferably calculated by $v = E/(2G) - 1$, with E being the Young's modulus and G being the shear modulus. Both E and G are preferably determined by an ultrasonic echography method, in particular according to ASTM C623.

Preferably, the CTE of the glass substrate is in the range of from 3 ppm/K to 11 ppm/K, more preferably 3.1 ppm/K to 10 ppm/K, even more preferably 3.2 ppm/K to 9 ppm/K, and still more is preferably from 3.25 ppm/K to 8.7 ppm/K. Such CTE is particularly advantageous for achieving comparably low interactive stresses.

Preferably, the glass substrate has a thickness in the range of from 0.02 mm to 2 mm, more preferably from 0.05 mm to 1.5 mm, more preferably from 0.1 mm to 1 mm, even more preferably from 0.15 mm to 0.7 mm, and still more preferably from 0.2 mm to 0.5 mm. A thin glass substrate is particularly advantageous as there is a trend towards smaller/thinner products such as for example mobile phones in which the band-pass NIR filter of the present disclosure may be used. On the other hand, very thin glasses may be more difficult for handling, coating and/or dicing. Therefore, it is advantageous if the glass substrate has a thickness within the above-indicated ranges that are balanced regarding both requirements.

Preferably, the glass of the glass substrate is selected from the group consisting of silicate glasses (in particular soda-lime glasses), borosilicate glasses, aluminosilicate glasses and aluminoborosilicate glasses. Borosilicate glasses, aluminosilicate glasses and soda-lime glasses are particularly preferred.

In preferred embodiments of the present disclosure, the glass preferably comprises the following components in the indicated ranges in % by weight:

| Component | % by weight |
| --- | --- |
| $SiO_2$ | 55-70 |
| $Al_2O_3$ | 15-25 |
| $B_2O_3$ | 1-10 |
| $Li_2O + Na_2O + K_2O$ | 10-20 |
| $MgO + CaO + SrO + BaO + ZnO$ | 0.5-5 |
| $TiO_2 + ZrO_2$ | 0-5 |
| $P_2O_5$ | 0-2 |

In preferred embodiments of the present disclosure, the glass preferably comprises the following components in the indicated ranges in % by weight:

| Component | % by weight |
| --- | --- |
| $SiO_2$ | 60-70 |
| $Al_2O_3$ | 10-20 |
| $B_2O_3$ | 5-15 |
| $Li_2O + Na_2O + K_2O$ | 0-0.1 |
| $MgO + CaO + SrO + BaO + ZnO$ | 5-12 |
| $TiO_2 + ZrO_2$ | 0-5 |
| $P_2O_5$ | 0-2 |

In preferred embodiments of the present disclosure, the glass preferably comprises the following components in the indicated ranges in % by weight:

| Component | % by weight |
| --- | --- |
| $SiO_2$ | 63-85 |
| $Al_2O_3$ | 0-10 |
| $B_2O_3$ | 5-20 |
| $Li_2O + Na_2O + K_2O$ | 2-14 |
| $MgO + CaO + SrO + BaO + ZnO$ | 0-12 |
| $TiO_2 + ZrO_2$ | 0-5 |
| $P_2O_5$ | 0-2 |

In preferred embodiments of the present disclosure, the glass preferably comprises the following components in the indicated ranges in % by weight:

| Component | % by weight |
| --- | --- |
| $SiO_2$ | 60-84 |
| $Al_2O_3$ | 0-10 |
| $B_2O_3$ | 3-18 |
| $Li_2O + Na_2O + K_2O$ | 5-20 |
| $MgO + CaO + SrO + BaO + ZnO$ | 0-15 |
| $TiO_2 + ZrO_2$ | 0-4 |
| $P_2O_5$ | 0-2 |

In preferred embodiments of the present disclosure, the glass preferably comprises the following components in the indicated ranges in % by weight:

| Component | % by weight |
| --- | --- |
| $SiO_2$ | 58-65 |
| $Al_2O_3$ | 14-25 |
| $B_2O_3$ | 6-10.5 |
| $MgO + CaO + SrO + BaO + ZnO$ | 8-18 |
| $ZnO$ | 0-2 |

In preferred embodiments of the present disclosure, the glass preferably comprises the following components in the indicated ranges in % by weight:

| Component | % by weight |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

In preferred embodiments of the present disclosure, the glass preferably comprises the following components in the indicated ranges in % by weight:

| Component | % by weight |
| --- | --- |
| $SiO_2$ | 52-66 |
| $B_2O_3$ | 0-8 |
| $Al_2O_3$ | 15-25 |
| $MgO + CaO + SrO + BaO + ZnO$ | 0-6 |
| $ZrO_2$ | 0-2.5 |
| $Li_2O + Na_2O + K_2O$ | 4-30 |
| $TiO_2 + CeO_2$ | 0-2.5 |

In the above described glass compositions, $As_2O_3$, $Sb_2O_3$, $SnO_2$, $SO_3$, Cl, F and/or $CeO_2$ can be used as refining agents in amounts of from 0 to 2% by weight.

In addition to the small scale factor I, the glass substrates of the disclosure are also highly advantageous glass substrates for band-pass NIR filters because the difference $$\frac{L_{OT,HRF}}{L_{CT,HRF}} - \frac{L_{OT,GL} - L_{TS,GL}}{L_{CT,GL}}$$

is very small. This is associated with reduced refractive index shifts at the operating temperature.

As described above, the method of the disclosure comprises the step of providing a band-pass NIR coating comprising alternating layers of high refractive index material and low refractive index material on at least one side of the glass substrate so that the high refractive index material is in direct contact with the glass substrate and has a length $L_{CT,HRF}$, wherein the glass substrate reaches a maximum temperature $T_{CT}$ and a maximum length $L_{CT,GL}$ during provision of the coating. The coating temperature $T_{CT}$ is higher than the temperature $T_0$. Preferably, $T_{CT}$ is higher than 200° C., more preferably higher than 250° C., and still more preferably at least 300° C. In certain preferred embodiments, $T_{CT}$ is even as high as at least 350° C., at least 400° C. or even up to 500° C. In particular, it has to be noted that highly preferred coating methods are associated with high coating temperatures.

Importantly, at increased temperatures a decrease of the fictive temperature of the glass substrate may occur so that the glass becomes shorter than its initial length. This decrease of the fictive temperature of the glass substrate may be influenced by the thermal history of the glass during the production thereof. Glasses are generally produced by melting glass raw materials. Subsequently, the glass melt is allowed to cool down. A glass that is cooled fast through the transformation region has a comparably high fictive temperature and low density and thus a higher shrinkage potential upon reheating as compared to a glass that is cooled with lower cooling rate through the transformation region.

In this respect, the cooling state of a glass may be introduced as a measure for the conditions during the cooling of the glass. A conventionally "quenched" glass, which was cooled very fast from the melt has a high cooling state. The ions in such a glass are "frozen" in a comparably disordered state. So to speak, by fast cooling from the melt, the glass is thus "frozen" on a high energy level.

If a glass is reheated to elevated temperatures, a decrease of the fictive temperature may occur. The extent of decrease of the fictive temperature is dependent upon two different phenomena. First, glasses having a comparably high cooling state show a stronger decrease of the fictive temperature than glasses having a comparably low cooling state under otherwise is identical conditions. Second, the closer the elevated temperature is to the annealing point of the glass, the more decrease in fictive temperature of the glass substrate occurs. The annealing point of the glass is the temperature at which its viscosity is $10^{13}$ Poise. At such a viscosity, the glass is still too hard for significant external deformation without breaking, but it is soft enough for fast relaxation of internal strains by microscopic flow and thus allows a decrease of the fictive temperature of the glass. Importantly, it is not necessary for a decrease of the fictive temperature to occur that the glass is actually reheated to the annealing point. Rather, decrease of the fictive temperature occurs at temperatures well below the annealing point, however, with slower rates. Thus, the closer the elevated temperature is to the annealing point of the glass, the faster the decrease of the fictive temperature. Consequently, when reheated for the same time span to the same temperature, a glass whose annealing point is closer to the reheating temperature is having more decrease of the fictive temperature.

The first phenomenon described above is a thermodynamic phenomenon that can be described as the shrinkage potential. Fast cooling through the transformation region leads to the glass being "frozen" on a high energy level that can be reduced upon reheating so that a comparably strong decrease of the fictive temperature can occur. The second phenomenon on the other hand is a kinetic phenomenon. The closer the elevated temperature is to the annealing point of the glass, the faster and thus the more the fictive temperature decreases under otherwise identical conditions.

Importantly, a decrease in the fictive temperature is associated with an increase in density and with length reduction. Thus, the length of a glass substrate at the operating temperature or at the dicing temperature is dependent upon two different underlying phenomena. On the one hand, it is clear that within a certain temperature range the length of the glass substrate is dependent on the temperature in such a way that the length of the glass is higher if the temperature is higher. For example, as the coating temperature of the glass is higher than the operating temperature or the dicing temperature, the length of the glass is lower at the operating temperature or at the dicing temperature as compared to the coating temperature.

On the other, the additional length reduction inferred to the glass substrate due to the is decrease of fictive temperature as described above, results in an even shorter length of the glass substrate.

The present disclosure is related to the difference $$\frac{L_{OT,HRF}}{L_{CT,HRF}} - \frac{L_{OT,GL} - L_{TS,GL}}{L_{CT,GL}}$$

being comparably small.

$$\frac{L_{OT,HRF}}{L_{CT,HRF}}$$

indicates the relative length decrease of the high refractive index material (HRF) at the operating temperature $T_{OT}$ as compared to the coating temperature $T_{CT}$. The coating temperature $T_{CT}$ is higher than the operating temperature $T_{OT}$. Consequently, the length $L_{OT,HRF}$ of the high refractive index material at $T_{OT}$ is smaller than the length $L_{CT,HRF}$ of the high refractive index material at $T_{CT}$. The same is true for the glass. As the changes in length with temperature of the glass are normally stronger with respect to temperatures $T_{OT}$ and $T_{CT}$ as compared to the high refractive index material, the ratio $$\frac{L_{OT,HRF}}{L_{CT,HRF}}$$

is normally larger than the ratio $$\frac{L_{OT,GL}}{L_{CT,GL}}.$$

This results in interactive stress. Moreover, due to the additional length reduction associated with the decrease of fictive temperature of the glass that is described in detail above, the length of the glass substrate at $T_{OT}$ is more accurately described by $L_{OT,GL}$-$L_{TS,GL}$, wherein $L_{TS,GL}$ denotes the additional length reduction of the glass due to the decrease of fictive temperature upon heating to the coating temperature $T_{CT}$. Notably, this additional length reduction while occurring at the elevated coating temperatures remains present at lower temperatures such as $T_0$, $T_{OT}$ or $T_{DT}$. Thus, as the additional length reduction increases the difference of the relative length decrease of the high refractive index material and of the glass substrate at the operating temperature $T_{OT}$ as compared to the coating temperature $T_{CT}$, the additional length reduction due to decrease of fictive temperature contributes to an increased interactive stress.

Therefore, in order to reduce the interactive stress, it is advantageous if $L_{TS,GL}$ is small so that the difference $$\frac{L_{OT,HRF}}{L_{CT,HRF}} - \frac{L_{OT,GL} - L_{TS,GL}}{L_{CT,GL}}$$

is small as well. $L_{TS,GL}$ is larger, the larger the cooling state of the glass is and the closer the coating temperature $T_{CT}$ is to the annealing point of the glass as described above. Thus, a small difference $$\frac{L_{OT,HRF}}{L_{CT,HRF}} - \frac{L_{OT,GL} - L_{TS,GL}}{L_{CT,GL}}$$

can be achieved by using glasses having a comparably low cooling state and/or glasses whose annealing point is comparably high so that the difference of annealing point and coating temperature $T_{CT}$ is high as well. Notably, highly preferable coating methods are associated with high coating is temperatures so that reducing the coating temperature is in principle another option which is, however, less preferred.

According to the present disclosure, the difference $$\frac{L_{OT,HRF}}{L_{CT,HRF}} - \frac{L_{OT,GL} - L_{TS,GL}}{L_{CT,GL}}$$

is smaller than 0.05. Preferably, the difference $$\frac{L_{OT,HRF}}{L_{CT,HRF}} - \frac{L_{OT,GL} - L_{TS,GL}}{L_{CT,GL}}$$

is at most 0.04, more preferably at most 0.03, more preferably at most 0.02, more preferably at most 0.01, more preferably at most 0.005, more preferably at most 0.002, more preferably at most 0.001, more preferably at most 0.0005, more preferably at most 0.0002, and still more preferably at most 0.0001.

Preferably, the high refractive index material has a refractive index in a range of from 2 to 4.5, and more preferably from 2.5 to 4. Preferably, the high refractive index material is selected from the group consisting of hydrogenated amorphous silicon (a-Si:H), $TiO_2$, $ZrO_2$, $Nb_2O_5$, $Ta_2O_5$ and combinations thereof. Preferably, the refractive index of the high refractive index material is higher than the refractive index of the low refractive index material.

Preferably, refractive index of the low refractive index material is lower than 2. More preferably, the refractive index of the low refractive index material is in a range of from 1.4 to 1.5. Preferably, the low refractive index material is $SiO_2$. According to the present disclosure, the term "refractive index" refers to the refractive index $n_d$ unless indicated otherwise.

Preferably, the step of providing the band-pass NIR coating on at least one side of the glass substrate comprises applying the high refractive index material by a magnetron sputtering process or by an electron/thermal evaporation deposition process. The magnetron sputtering process is more preferred as it is particularly suitable for deposition of a-Si:H which is in turn advantageous due to its particularly high refractive index.

Preferably, the coating temperature $T_{CT}$ is in the range of from 200° C. to 500° C., more preferably, from 200° C. to 400° C., and still more preferably from 250° C. to 300° C.

The operating temperature $T_{OT}$ may for example be in the range of from 30° C. to 70° C., such as from 30° C. to 50° C. or from 30° C. to 40° C., mainly depending on the surrounding temperature and the mode of operation. Notably, the operating temperature is generally higher than the is surrounding temperature due to the heat generated by the device, for example smart phone, in which the band-pass NIR filter is used, for example for object recognition, in particular facial recognition. As described above, temperature $T_0$ is lower than 30° C. Preferably, temperature $T_0$ is higher than 0° C.

Preferably, the method of the disclosure comprises the additional step of dicing the coated glass substrate prior or subsequent to step c), wherein the coated glass substrate at the dicing temperature $T_{DT}$ with $T_0$ $T_{DT}$<$T_{CT}$ has the property that the glass has a length $L_{DT,GL}$-$L_{TS,GL}$ and that the high refractive index material being in direct contact with the glass substrate has a length $L_{DT,HRF}$, wherein the difference $$\frac{L_{DT,HRF}}{L_{CT,HRF}} - \frac{L_{DT,GL} - L_{TS,GL}}{L_{CT,GL}}$$

is smaller than 0.05. Preferably, the difference $$\frac{L_{DT,HRF}}{L_{CT,HRF}} - \frac{L_{DT,GL} - L_{TS,GL}}{L_{CT,GL}}$$

is at most 0.04, more preferably at most 0.03, more preferably at most 0.02, more preferably at most 0.01, more preferably at most 0.005, more preferably at most 0.002, more preferably at most 0.001, more preferably at most 0.0005, more preferably at most 0.0002, and still more preferably at most 0.0001.

Dicing the glass substrate after coating is reasonable because it enables applying the coating to a larger surface and is thus more economical. However, as described above, differences in the relative length decrease of the high refractive index material and of the glass substrate at the dicing temperature $T_{DT}$ as compared to the coating temperature $T_{CT}$ result in interactive stress that reduces the yield of the production process because the probability of breakage during the dicing process increases. Hence, it is advantageous that the difference $$\frac{L_{DT,HRF}}{L_{CT,HRF}} - \frac{L_{DT,GL} - L_{TS,GL}}{L_{CT,GL}}$$

is small. As described above for the difference $$\frac{L_{OT,HRF}}{L_{CT,HRF}} - \frac{L_{OT,GL} - L_{TS,GL}}{L_{CT,GL}},$$

also a small difference $$\frac{L_{DT,HRF}}{L_{CT,HRF}} - \frac{L_{DT,GL} - L_{TS,GL}}{L_{CT,GL}}$$

can be achieved by using glasses having a comparably low cooling state and/or glasses whose annealing point is comparably high so that the difference of annealing point and coating temperature $T_{CT}$ is high as well.

In order to avoid very high temperatures during dicing, the dicing process is preferably done with water cooling. Preferably, the dicing temperature $T_{DT}$ is the range of from 15° C. to 25° C., such as from 21° C. to 25° C.

As described above, the present disclosure also relates to a band-pass near-infrared (NIR) filter comprising a glass substrate and at least one coating, wherein the glass substrate has a scale factor I that is smaller than 1500 kPa/K, wherein I is defined by the equation $$I = \frac{E}{1-v} \cdot \alpha,$$

wherein E is the Young's modulus, v is the Poisson's ratio and a is the coefficient of thermal expansion (CTE) in the range of 20° C. to 300° C., and wherein the maximum internal stress of the glass substrate at operating temperature $T_{OT}$ is smaller than 300 MPa. Preferably, the band-pass NIR filter of the disclosure is obtainable or obtained by the method of the disclosure described in detail above.

With regard to preferred glass compositions, scale factor I and the parameters Young's modulus, Poisson's ratio and CTE in the range of 20° C. to 300° we refer to the description above. As described above, the interactive stress may affect the refractive index n of the glass substrate because glass is a photoelastic material. This is summarized in the following equation according to which the change in refractive index can be calculated as the product of the internal stress a and the stress optical coefficient (SOC).

$$\Delta n = \sigma \cdot SOC \quad (4)$$

Therefore, an efficient way of minimizing the impacts from photoelastic effects may be reducing the interactive stress. According to the present disclosure, the maximum internal stress of the glass substrate at operating temperature $T_{OT}$ is smaller than 300 MPa, preferably smaller than 250 MPa, and more preferably smaller than 200 MPa. The maximum internal stress refers to the internal stress at the surface of the glass substrate, in particular at the surface of the glass substrate being in contact with the NIR coating, in particular with the high refractive index material of the coating because this is the position at which 6(x) has its maximum. The maximum internal stress may, for example, be determined with a polarized stress meter. As described above, the values of interactive stress and maximum internal stress is are identical according to the present disclosure. Therefore, the maximum internal stress may also be calculated based on equation (1) above in case thickness, Young's modulus and Poisson's ratio of glass substrate and coating as well as the bending radius induced by the interactive stress between glass substrate are known.

Preferably, the glass has a SOC in the range of from 20 to 40 (nm/cm)/MPa, more preferably from 20 to 35 (nm/cm)/MPa, more preferably from 20 to 30 (nm/cm)/MPa, and still more preferably from 20 to 25 (nm/cm)/MPa. The SOC is preferably determined according to ASTM C770.

Preferably, the band-pass NIR filter has a thickness d in the range of from 0.02 mm to 2 mm, more preferably from 0.05 to 1 mm, more preferably from 0.1 to 0.7 mm, and still more preferably from 0.2 to 0.5 mm.

Preferably, the band-pass NIR filter has a size in the range of from 1*1 mm$^2$ to 100*100 mm$^2$, more preferably from 2*2 mm$^2$ to 10*10 mm$^2$, more preferably from 3*3 mm$^2$ to 5*mm$^2$, and still more preferably about 4*4 mm$^2$.

As described above, the band-pass NIR filter of the disclosure is characterized by comparably low interactive stresses. This is also advantageous because it enables achieving a low warp.

Preferably, the band-pass NIR filter has a relative warp RW in the range of from 0.02 µm to 2 am per 1 mm$^2$ band-pass NIR filter size, more preferably from 0.05 µm to 1 µm per 1 mm$^2$ band-pass NIR filter size, and still more preferably from 0.1 µm to 0.5 µm per 1 mm$^2$ band-pass NIR filter size.

Preferably, the band-pass NIR filter has an absolute warp AW in the range of from 1 µm to 50 mm, more preferably from 2 µm to 10 mm, more preferably from 5 µm to 1 mm, and still more preferably from 10 µm to 100 µm.

Preferably, the wavelength of maximum transmittance through the band-pass NIR filter at an incident angle of 90° (vertical transmission) is in the range of from 810 nm to 940 nm. These is wavelengths are particularly advantageous for the desired applications in object recognition.

It is another advantage of band-pass NIR filters of the disclosure that it has a very low angle shift. Thus, the wavelength of the highest transmittance (the maximum transmittance wavelength) does not shift very much when the light enters at an incident angle different from 90°, for example 30°. This is advantageous because enables detection of light entering in different angles. Preferably, the absolute value of difference of the maximum transmittance wavelength at an incident angle of 90° (vertical transmission) and the maximum transmittance wavelength at an incident angle of 30° is in the range of from 1 nm to 50 nm, more preferably less than 30°, more preferably less than 25°, more preferably less than 20°, more preferably less than 15°, and still more preferably less than 10°.

Preferably, the band-pass NIR filter has a total transmittance of at least 80%, more preferably at least 85%, more preferably at least 90%, and still more preferably at least 95% at the maximum transmittance wavelength. The terms "transmittance" and "transmission" are used synonymously according to the present disclosure.

Preferably, the band-pass NIR filter has a total transmittance of less than 20% at the wavelengths of maximum transmittance wavelength±150 nm, more preferably ±100 nm, more preferably±75 nm, and still more preferably±50 nm.

The present disclosure also relates to the use of a band-pass NIR of the disclosure in an infrared sensor, such as for object recognition, in particular for facial recognition.

EXAMPLES

Seven groups of glasses (Table 1) were selected for a magnetron sputtering process aimed for a NIR bandpass filter centered at 940 nm. Glass pieces with the size of 77*77 mm$^2$ were coated with $SiO_2$/a-Si:H on one side with a total thickness of 5730 nm. The warp of each glass piece was measured with a plug gauge, and the results are shown in Table 1. The magnitude of warp generally follows the trend that thinner glass with bigger CTE (as the coating material used in this experiment has smaller CTE) shows larger warp. Conveniently, manufactures usually separate the $SiO_2$/a-Si:H coating into two to coat both sides of the glass. Although the warp can be significantly reduced by this method as the interactive stresses on both sides are balanced, the interactive stresses are not eliminated.

TABLE 1

| Glass | Young's modulus [GPa] | Poisson's ratio | CTE (20-300° C.) [10$^{-6}$/K] | Thickness [mm] | Scale factor I [kPa/K] | Warp [mm] |
|---|---|---|---|---|---|---|
| #1 | 64 | 0.2 | 3.25 | 0.2 | 260 | 4.30 |
| #2 | 69.3 | 0.22 | 7.58 | 0.4 | 673 | 1.27 |
| #3 | 73.9 | 0.23 | 3.17 | 0.4 | 304 | 1.01 |
| #4 | 73.3 | 0.216 | 8.7 | 0.4 | 813 | 1.25 |
| #5 | 74.8 | 0.24 | 3.2 | 0.4 | 315 | 1.15 |
| #6 | 72.9 | 0.21 | 7.2 | 0.4 | 664 | 1.41 |
| #7 | 83 | 0.225 | 8.5 | 0.4 | 910 | 1.20 |

Figure 1B:
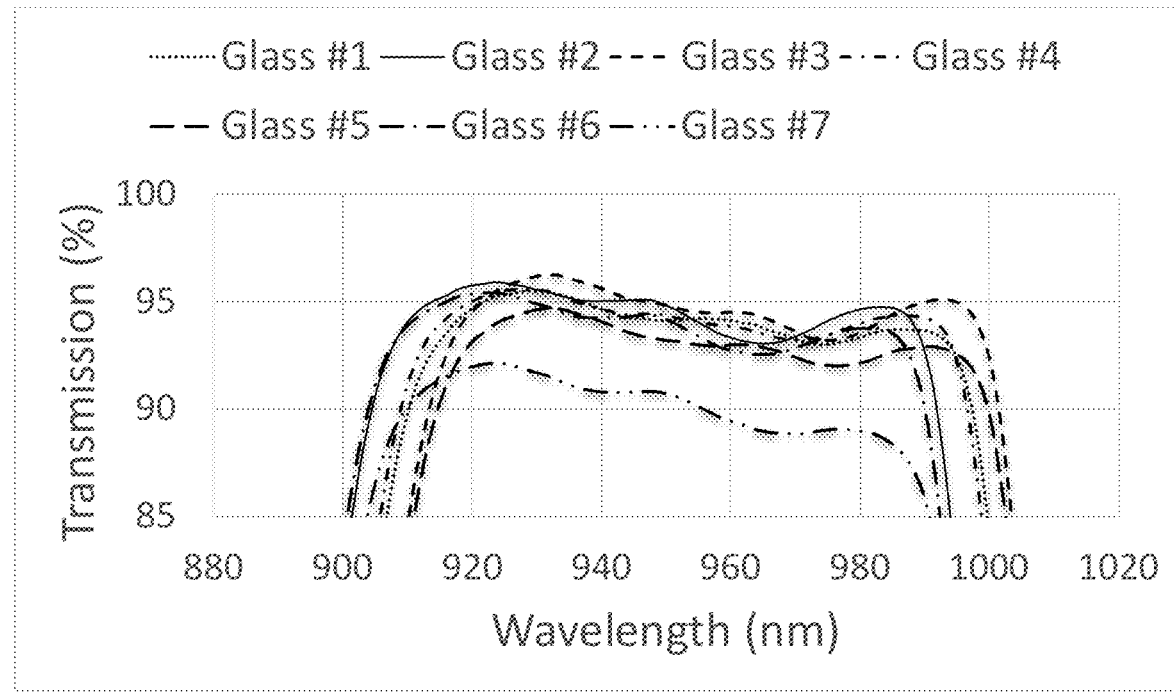
Figure 2A:
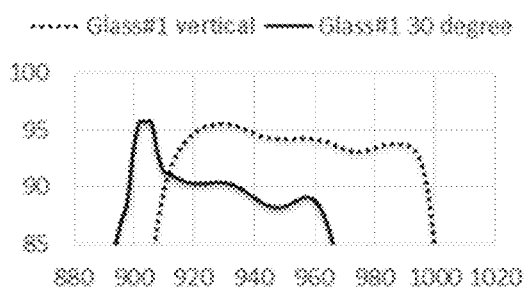
FIGS. 2a to 2g show a comparison of vertical transmission and transmission at an incident angle of 30° for the different example band-pass NIR filters.
Figure 2B:
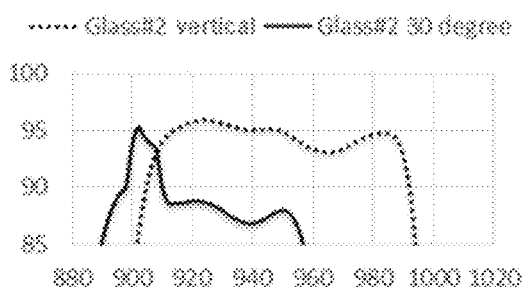
Figure 2C:
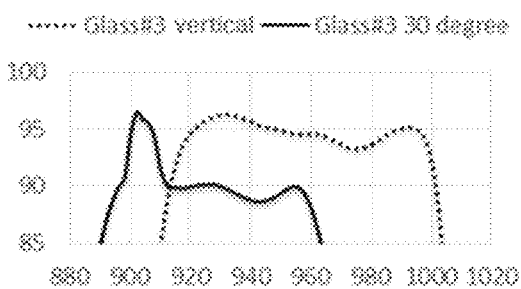
Figure 2D:
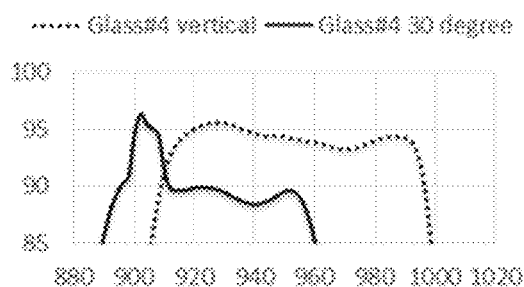
Figure 2E:
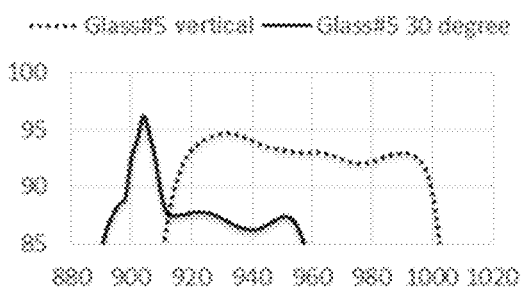
Figure 2F:
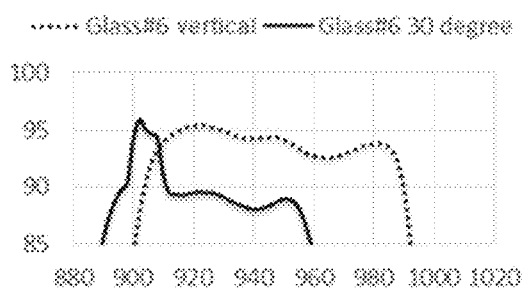
Figure 2G:
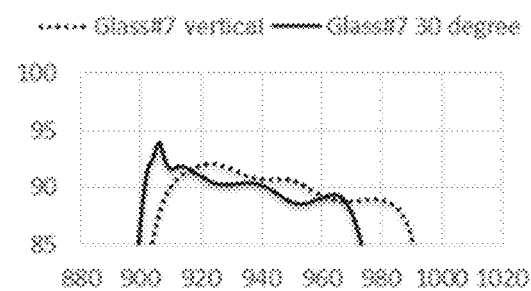

The glasses were then AR (anti-reflection) coated on the other side, and the transmission of each group was measured in the range of 650 nm to 1200 nm (FIG. 1). All groups showed similar transmission in the range of interest. The transmission at an incident angle of 30° was also measured, and a 10 nm to 20 nm shift was observed as shown in FIG. 2.

Figure 3:
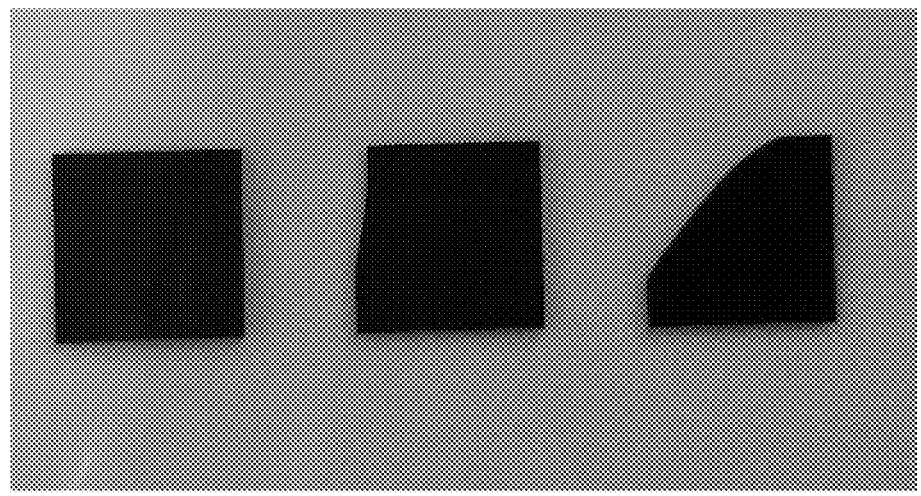
FIG. 3 shows representative examples of NIR filters of the categories "intact" (left), "small chipping" (middle) and "big crack" (right) that NIR filters can be categorized in after dicing.
Figure 4:
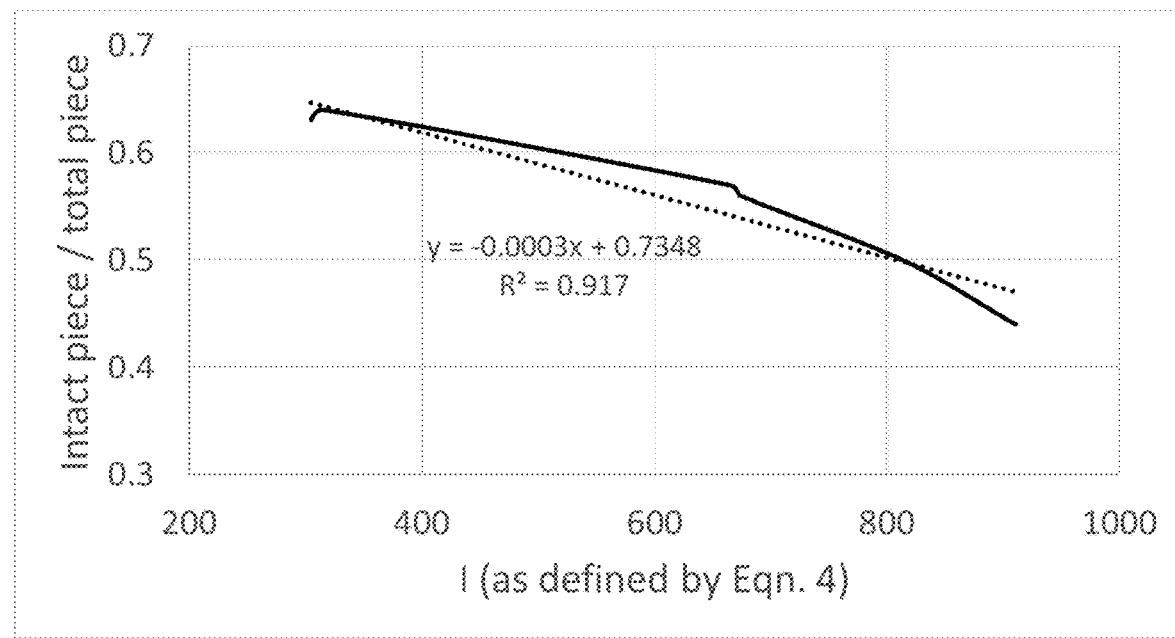
FIG. 4 shows the ratio of intact piece over total piece as a function of the scale factor I. The solid line represents the experimental data while the dotted line shows the function fitted to the experimental data.

The 77*77 mm glass pieces were then diced into small pieces with the size of 7*7 mm$^2$ to evaluate the feasibility of dicing process for each group. Based on the integrity, the samples can be generally divided into "intact", "small chipping" and "big crack" as shown in FIG. 3 from left to right, respectively. The ratio of intact piece over total piece was plotted (FIG. 4) as a function of the scale factor I (as defined by equation 4). As mentioned above, bigger I indicates larger interactive stress for same coating settings. FIG. 4 shows that bigger I generally yields smaller intact ratio (i.e. yielding rate). It then can be easily derived that I is inversely proportional to the yielding rate of the dicing process.

The small pieces were also tested with a ball-on-ring test by placing the glass on a 6 mm hole while being pushed by a pin having a diameter of 1 mm with a speed of 1 mm/min. The failure load was summarized in FIG. 5. Glass-AR indicates that the AR-coated side is facing towards the pushing pin while glass-Si indicates that the SiO$_2$/a-Si:H —locoated side is facing towards the is pushing pin. The failure load did not show a clear trend as a function of glass properties.

Figure 5:
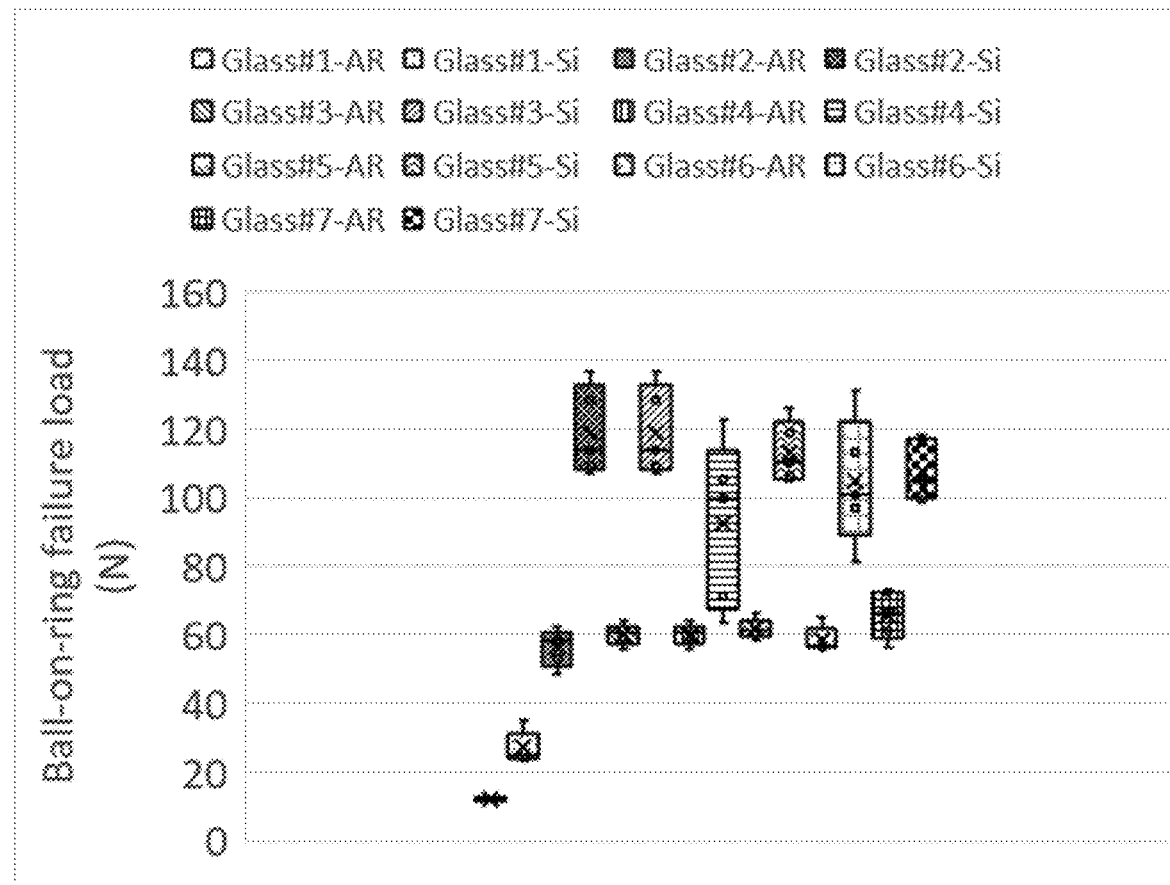
FIG. 5 shows the results of ball-on-ring failure load tests for the different example NIR filters. Notably, the results are dependent on the orientation of the samples during testing. Glass-AR indicates that the AR-coated side is facing towards the pushing pin while glass-Si indicates that the $SiO_2$/a-Si:H—coated side is facing towards the pushing pin. AR coating means anti-reflection coating. There are 14 different sample types that are shown from left to right as follows: Glass #1-AR, Glass #1-Si, Glass #2-AR, Glass #2-Si, Glass #3-AR, Glass #3-Si, Glass #4-AR, Glass #4-Si, Glass #5-AR, Glass #5-Si, Glass #6-AR, Glass #6-Si, Glass #7-AR, Glass #7-Si.

However, as FIG. 5 clearly showed, when the SiO$_2$/a-Si:H coating was facing the ring (glass-AR samples), the failure load was significantly reduced, which can be attributed to interactive stress and surface defects. In particular, it seems that the interactive stress generated due to different shrinkage of SiO$_2$/a-Si:H coating and glass substrate was a major factor relevant for reduction of failure load. This validates the negative effects of interactive stress on the yielding rate of dicing.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

The invention claimed is:

1. A method of producing a band-pass near-infrared (NIR) filter, the method comprising the following steps:
   a) providing a glass substrate having a length $L_0,G_L$ at a temperature $T_0$ and having a scale factor I that is smaller than 1500 kPa/K, wherein I is defined by the equation $$I = \frac{E}{1-\upsilon} \cdot \alpha,$$

wherein E is a Young's modulus of the glass substrate, v is a Poisson's ratio of the glass substrate, and a is a coefficient of thermal expansion (CTE) of the glass substrate in a range of 20° C. to 300° C.,
   b) depositing a band-pass NIR coating comprising alternating layers of a high refractive index material and a low refractive index material on at least one side of the glass substrate to form a coated glass substrate, so that the high refractive index material is in direct contact with the glass substrate and has a length $L_{CT,HRF}$, wherein the glass substrate reaches a maximum temperature $T_{CT}$ and a maximum length $L_{CT,GL}$ during deposition of the coating,
   c) letting the coated glass substrate cool to the temperature $T_0$, wherein $T_0$ is lower than 30° C., and wherein the glass has a length $L_{0,GL}$-$L_{TS,GL}$ when reaching $T_0$, and wherein $L_{TS,GL}$ accounts for length reduction due to a decrease of fictive temperature,
   wherein the glass has a length $L_{OT,GL}$-$L_{TS,GL}$ when being heated to an operating temperature $T_{OT}$ subsequent to step c) with $T_0 < T_{OT} < T_{CT}$,
   wherein the high refractive index material in direct contact with the glass substrate has a length $L_{OT,HRF}$ at temperature $T_{OT}$, and
   wherein a difference $$\frac{L_{OT,HRF}}{L_{CT,HRF}} - \frac{L_{OT,GL} - L_{TS,GL}}{L_{CT,GL}}$$

is smaller than 0.05.

2. A band-pass near-infrared (NIR) filter comprising:
   a glass substrate; and
   at least one coating,
   wherein the glass substrate has a scale factor I that is smaller than 1500 kPa/K, wherein I is defined by the equation $$I = \frac{E}{1-\upsilon} \cdot \alpha,$$

wherein E is a Young's modulus of the glass substrate, v is a Poisson's ratio of the glass substrate, and α is a coefficient of thermal expansion (CTE) of the glass substrate in a range of 20° C. to 300° C., and
   wherein a maximum internal stress of the glass substrate at operating temperature $T_{OT}$ is smaller than 300 MPa.

3. The band-pass NIR filter according to claim 2, wherein the band-pass NIR filter has a thickness d in a range of from 0.02 mm to 2 mm.

4. The band-pass NIR filter according to claim 2, wherein the band-pass NIR filter has a size in a range of from 1*1 mm$^2$ to 100*100 mm$^2$.

5. The band-pass NIR filter according to claim 2, wherein the band-pass NIR filter has a relative warp RW in a range of from 0.02 μm to 2 μm per 1 mm$^2$ band-pass NIR filter size.

6. The band-pass NIR filter according to claim 2, wherein the band-pass NIR filter has an absolute warp AW in a range of from 1 μm to 50 mm.

7. The band-pass NIR filter according to claim 2, wherein the wavelength of maximum transmittance through the band-pass NIR filter at an incident angle of 90° (vertical transmission) is in a range of from 810 nm to 940 nm.

8. The band-pass NIR filter according to claim 2, further comprising an absolute value of a difference between a maximum transmittance wavelength at an incident angle of 90° (vertical transmission) and a maximum transmittance wavelength at an incident angle of 30°, wherein the absolute value is in a range of from 1 nm to 50 nm.

9. The band-pass NIR filter according to claim 2, wherein the band-pass NIR filter has a total transmittance of at least 80% at a maximum transmittance wavelength.

10. The band-pass NIR filter according to claim 2, wherein the band-pass NIR filter has a total transmittance of less than 20% at wavelengths of maximum transmittance wavelength±150 nm.

11. The band-pass NIR filter according to claim 2, wherein the NIR coating comprises alternating layers of high refractive index material having a refractive index of from 2 to 4.5 and low refractive index material having a refractive index of from 1.4 to 1.5.

12. The band-pass NIR filter according to claim 11, wherein the high refractive index material is selected from the group consisting of hydrogenated amorphous silicon (a-Si:H), $TiO_2$, $ZrO_2$, $Nb_2O_5$, $Ta_2O_5$, and combinations thereof.

13. The band-pass NIR filter according to claim 2, wherein the operating temperature $T_{OT}$ is in a range of from 30° C. to 70° C.

14. The band-pass NIR filter according to claim 2, wherein the glass substrate comprises a glass with the following components in the indicated ranges in % by weight:

| Component | % by weight |
|---|---|
| $SiO_2$ | 63-85 |
| $Al_2O_3$ | 0-10 |
| $B_2O_3$ | 5-20 |
| $Li_2O + Na_2O + K_2O$ | 2-14 |
| $MgO + CaO + SrO + BaO + ZnO$ | 0-12 |
| $TiO_2 + ZrO_2$ | 0-5 |
| $P_2O_5$ | 0-2. |

15. The band-pass NIR filter according to claim 2, wherein the glass substrate comprises a glass comprising the following components in the indicated ranges in % by weight:

| Component | % by weight |
|---|---|
| $SiO_2$ | 60-84 |
| $Al_2O_3$ | 0-10 |
| $B_2O_3$ | 3-18 |
| $Li_2O + Na_2O + K_2O$ | 5-20 |
| $MgO + CaO + SrO + BaO + ZnO$ | 0-15 |
| $TiO_2 + ZrO_2$ | 0-4 |
| $P_2O_5$ | 0-2. |

16. The band-pass NIR filter according to claim 2, wherein the glass substrate comprises a glass comprising the following components in the indicated ranges in % by weight:

| Component | % by weight |
|---|---|
| $SiO_2$ | 58-65 |
| $Al_2O_3$ | 14-25 |
| $B_2O_3$ | 6-10.5 |
| $MgO + CaO + SrO + BaO + ZnO$ | 8-18 |
| $ZnO$ | 0-2. |

17. The band-pass NIR filter according to claim 2, wherein the glass substrate comprises a glass comprising the following components in the indicated ranges in % by weight:

| Component | % by weight |
|---|---|
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2. |

18. The band-pass NIR filter according to claim 2, wherein the glass substrate comprises a glass comprising the following components in the indicated ranges in % by weight:

| Component | % by weight |
|---|---|
| $SiO_2$ | 52-66 |
| $B_2O_3$ | 0-8 |
| $Al_2O_3$ | 15-25 |
| $MgO + CaO + SrO + BaO + ZnO$ | 0-6 |
| $ZrO_2$ | 0-2.5 |
| $Li_2O + Na_2O + K_2O$ | 4-30 |
| $TiO_2 + CeO_2$ | 0-2.5. |

19. The band-pass NIR filter according to claim 2, wherein the glass substrate comprises a glass comprising the following components in the indicated ranges in % by weight:

| Component | % by weight |
|---|---|
| $SiO_2$ | 55-70 |
| $Al_2O_3$ | 15-25 |
| $B_2O_3$ | 1-10 |
| $Li_2O + Na_2O + K_2O$ | 10-20 |
| $MgO + CaO + SrO + BaO + ZnO$ | 0.5-5 |
| $TiO_2 + ZrO_2$ | 0-5 |
| $P_2O_5$ | 0-2. |

20. The band-pass NIR filter according to claim 2, wherein the glass substrate comprises a glass comprising the following components in the indicated ranges in % by weight:

| Component | % by weight |
|---|---|
| $SiO_2$ | 60-70 |
| $Al_2O_3$ | 10-20 |
| $B_2O_3$ | 5-15 |
| $Li_2O + Na_2O + K_2O$ | 0-0.1 |
| $MgO + CaO + SrO + BaO + ZnO$ | 5-12 |
| $TiO_2 + ZrO_2$ | 0-5 |
| $P_2O_5$ | 0-2. |

21. An infrared sensor comprising the band-pass NIR filter according to claim 2.

* * * * *